No. 655,085. Patented July 31, 1900.
T. A. HOWARD.
FEED BAG.
(Application filed July 13, 1898.)
(No Model.)
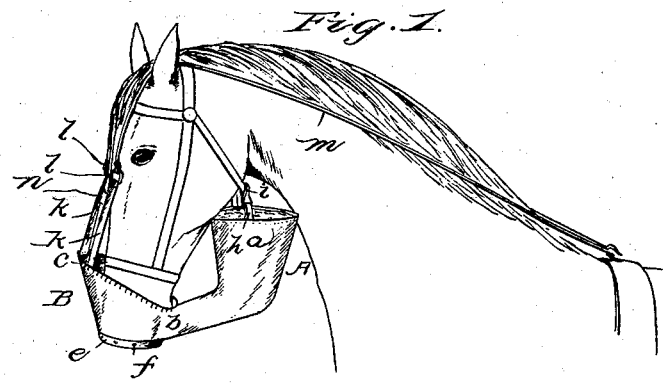
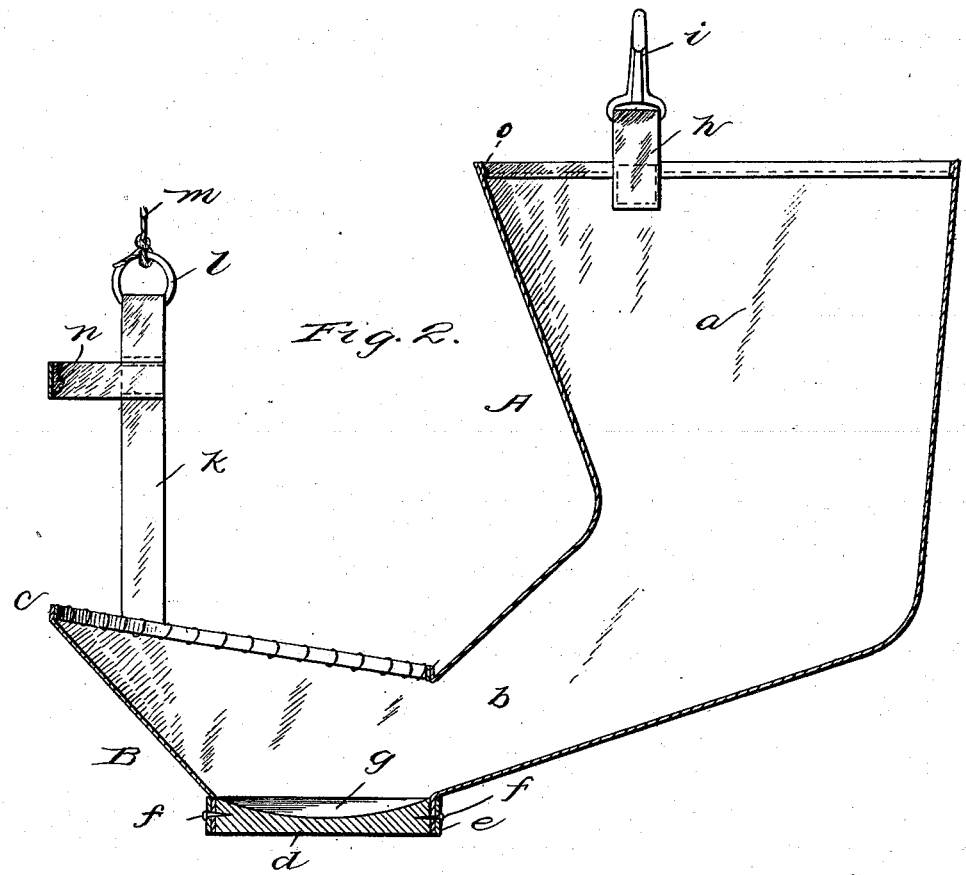
Witnesses
Inventor
Thomas A. Howard,
by Albert Popkins
Attorney
THE NORRIS PETERS CO., PHOTO-LITHO., WASHINGTON, D. C.

UNITED STATES PATENT OFFICE.

THOMAS A. HOWARD, OF BALTIMORE, MARYLAND, ASSIGNOR OF ONE-THIRD TO WILLIAM O. DAVIS, OF SAME PLACE.

FEED-BAG.

SPECIFICATION forming part of Letters Patent No. 655,085, dated July 31, 1900.

Application filed July 13, 1898. Serial No. 685,847. (No model.)

*To all whom it may concern:*

Be it known that I, THOMAS A. HOWARD, a citizen of the United States, residing at York road and Oakland avenue, Station H, in the city of Baltimore, State of Maryland, have invented certain new and useful Improvements in Feed-Bags for Horses, of which the following is a specification, reference being had therein to the accompanying drawings.

My invention relates to feed-bags for horses or other animals; and its primary object is to provide a feed-bag adapted to be attached to the head of the animal, with means for automatically supplying feed thereto.

Further objects of the invention are to provide improved means for attaching the bag to the harness, so that the bag may be used without unharnessing, and to so construct the feed-compartment of the device that waste of feed is avoided.

The novel features of the invention will be fully described hereinafter and defined in the appended claims, in connection with the accompanying drawings, in which—

Figure 1 is a perspective view of the device in position upon a horse's head, and Fig. 2 is a central vertical section of the same detached.

The device comprises a supply bag or hopper A and a feed-pouch B. The bag A, which is made of cloth, wire-gauze, or any suitable fabric, is in the form of a garment-sleeve having an enlarged upper portion $a$ and a contracted lower portion $b$. Both ends of the supply-bag are open, and the lower narrowed portion constitutes a conduit or passage-way which connects the upper supply compartment or hopper A with the feed-pouch B. The pouch B, which is also made of any suitable material, is preferably higher at its front side $c$ than at its rear side to form a guard to prevent spilling of the feed by the movement of the horse's head. The pouch B is open at its upper end, and its lower end is closed by a bottom $d$, which fits within the lower end of the pouch and is secured thereto by a band or ring $e$, of any material, which is held in place by nails or like fastenings $f$, passing through the pouch and driven into the peripheral edge of the bottom. This bottom $d$ is preferably made of wood, paper, or like stiff material to keep the pouch distended, and its upper surface $g$ is preferably hollowed out or dished to better support the feed and prevent it from accumulating around the edge of the bottom.

The upper end of the supply bag or hopper A is provided with oppositely-arranged tabs or straps $h$, secured at their lower ends to the bag and provided at their upper ends with snap-hooks or like fastenings $i$, adapted to engage opposite sides of the throat-latch or headstall of a bridle or halter, as shown in Fig. 1.

The front edge of the feed-pouch B is provided with upwardly-extending suspending-straps $k\ k$, secured at their lower ends to the feed-pouch and provided at their upper ends with rings or loops $l\ l$, to which are secured the ends of a cord $m$. The straps $k\ k$ are preferably connected by a cross-strap $n$.

The top edge of the feed-bag is stiffened by a hoop or ring $o$, of any suitable material, to keep the upper end of the bag distended.

As clearly shown in Fig. 1, the supply hopper or bag is suspended behind the horse's throat by the straps $h$, attached to the throat-latch or headstall, while the feed-pouch is suspended below the horse's mouth by the cord $m$, which passes rearward over his head and is engaged by the checkrein-hook on the harness-saddle or other convenient part of the harness.

It will be obvious that the grain contained in the supply-hopper will feed by gravity into the feed-pouch and that the feed will be gradual and dependent upon the amount of grain consumed by the animal.

An important feature of the device and its suspending means is that when the horse raises his head the feed-pouch is lowered, and, vice versa, when the horse's head is lowered the pouch is raised within easy reach of the animal. The construction and arrangement are such that the feed-pouch accommodates itself to all of the movements of the animal's head, thus preventing spilling and waste of the feed.

Having thus described my invention, what I desire to claim is—

1. As an improved article of manufacture a feed-bag comprising a hopper with enlarged mouth and a pouch and intermediate integral contracted portion, the pouch having its inner upper edge joined to the upper side of the lower end of the contracted portion and having inclined front side terminating at a point higher than the side joining the contracted portion, combined with a bottom to the pouch and independent attaching devices for the hopper and pouch, substantially as described.

2. As an improved article of manufacture a feed-bag for horses comprising a hopper of flexible material and having an enlarged mouth with means for holding the same open, a pouch and an intermediate connecting portion integral with the hopper, the connecting portion being contracted at its junction with the pouch, a bottom to the pouch, means for holding open the mouth of the pouch, means for attaching the pouch to the head of an animal the said hopper, pouch and contracted portion being all integral, and independent means for attaching the hopper to the neck of the animal, all substantially as and for the purpose specified.

In testimony whereof I affix my signature in presence of two witnesses.

THOMAS A. HOWARD.

Witnesses:
  WILLIAM M. OWINGS,
  THOS. W. STEWART.